July 9, 1963

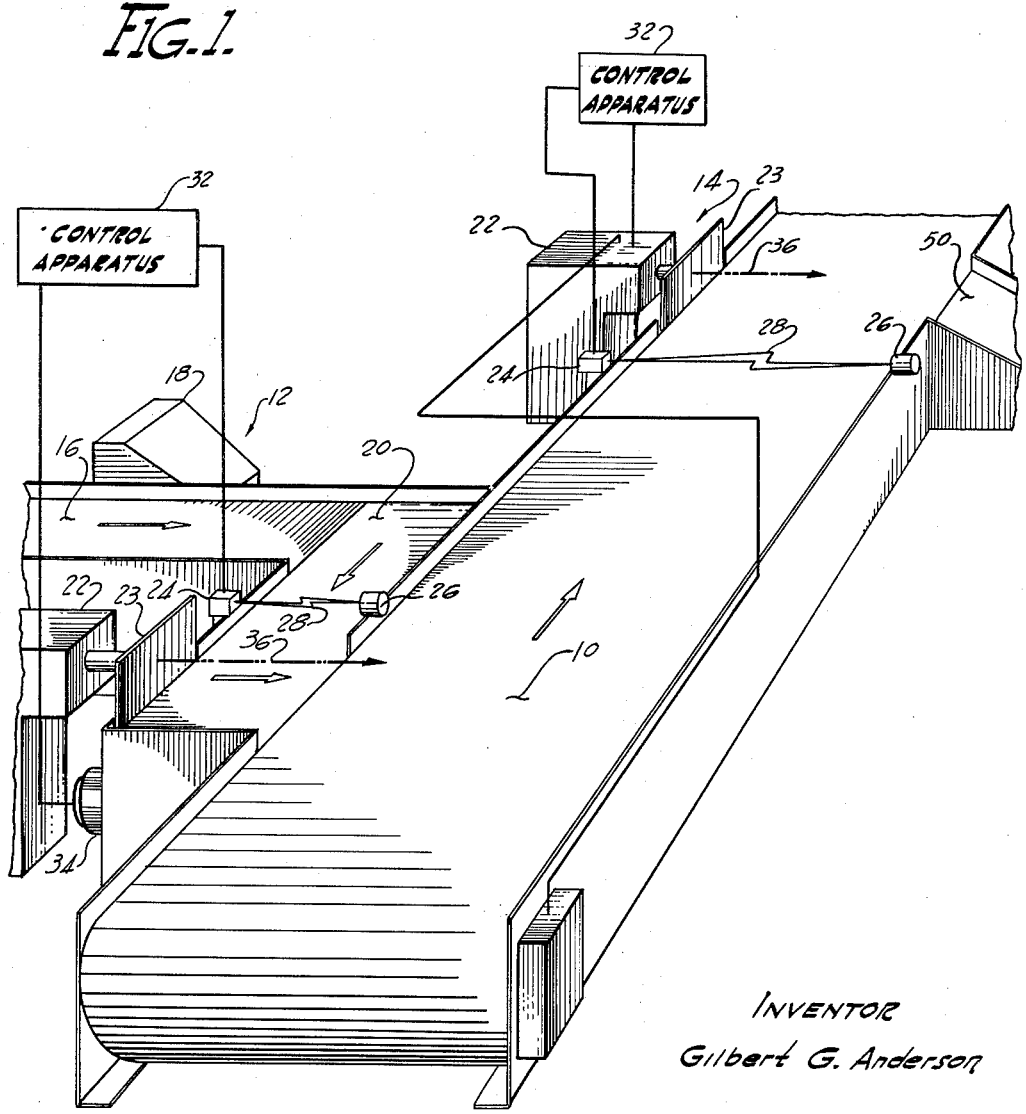

G. G. ANDERSON 3,096,871

CENTERING CONTROL

Filed Dec. 16, 1960

INVENTOR
Gilbert G. Anderson

By *William J. Newman*
Attorney

United States Patent Office 3,096,871
Patented July 9, 1963

3,096,871
CENTERING CONTROL
Gilbert G. Anderson, Chicago, Ill., assignor to Stewart-Warner Corporation, Chicago, Ill., a corporation of Virginia
Filed Dec. 16, 1960, Ser. No. 76,376
3 Claims. (Cl. 198—34)

This invention relates to the determination of a center of an object. More particularly this invention relates to the positioning of the geometric center of an object with respect to a reference position regardless of the size of the object.

The teachings of this inventiton are especially adaptable for use in automated package sortation systems such as disclosed in patent application Serial No. 67,330, filed November 4, 1960 by Warren G. Graybeal and William C. Smith wherein timing pulses initiate the loading on and transferring off a conveyor belt or chain. The description of the invention is directed toward such a system but it is to be recognized that it is adaptable to any application where it is desirable to align the center of a moving object with respect to a stationary reference.

Briefly, a package sortation system of this type comprises a main sort conveyor belt or chain with one or more loading stations at one end and one or more distribution branches (hereinafter referred to as sorts) located along the remaining length of the conveyor. The loading station may comprise a load belt upon which packages are manually or automatically loaded and a package removing mechanism (hereinafter referred to as a loading mechanism) such as a mechanically operated paddle to remove the object from the load belt and transfer it to the main sort conveyor. Address information pertaining to the destinatiaon of the package is coded into an analogue type device at the loading station which directs the object to the proper sort after it has been transferred to the conveyor. When the object reaches the proper sort, the analogue device causes another package removal mechanism (hereinafter referred to as a transfer mechanism) to transfer the object off of the main sort conveyor and onto the proper sort. The transfer mechanism may also comprise a mechanically operated paddle or other means to shift the package onto the sort, which may comprise a chute, roller conveyor, another belt, etc.

In a system using paddles or other means to remove the packages from a conveyor and transfer them to a desired location on another belt, or to a destination sort, it is most important that the center of the package be accurately positioned with respect to the package removal mechanism. Ordinarily, a package will be moved more effectively off the side of a conveyor if the center of the pushing mechanism is aligned with the transverse center line of the package when it makes contact therewith. Since the center of gravity of the packages will most generally coincide or not be far removed from the geometric center of the package the size of the pusher mechanism or paddle may be much smaller than if the mechanism and package were not properly aligned. The packages will, therefore, be more easily removed from the conveyor and be more accurately positioned after they are transferred to that portion of the system subsequent to the transfer point.

Furthermore, it is important that a package be accurately positioned at the load station end of the main sort conveyor so that the address information in the analogue device will follow the package along the conveyor and cause it to be deposited at the proper sort. This may be best accomplished by positioning the package and triggering the analogue device with respect to the geometric center of the package rather than using some other reference such as the leading or trailing edge of the package, as done in prior art sortation systems.

Centering packages with respect to the geometric center of the transfer mechanisms at the sorts along the main sort conveyor path produces real advantages other than those directly related to the removal of the packages therefrom. For example, the width of the individual sorts may be narrower if their center lines are properly positioned with the center of the transfer mechanism. It also follows that the main sort conveyor can be shorter due to the narrower width of the sorts. Packages may be placed closer together on the main sort conveyor because the size of the transfer mechanisms may be reduced if the packages are properly positioned for transferring. These all lead to greater efficiency and faster package handling as well as substantial savings in capital costs resulting from the reduced size of the system components. Substantial savings in initial costs and product handling expense are therefore made to the conveyor operator.

In sortation systems where all packages are the same length the problem of accurately determining and positioning the package center is not difficult. However, in systems such as are used for the sortation of mail or the handling of orders in wholesale supply firms, where the size of packages is not uniform and their size, order of handling and routing cannot be predetermined, the problem of package centering is magnified.

It is therefore an object of this invention to provide a method and means for determining the center of an object and positioning that object with respect to the reference position.

It is also an object of this invention to provide a control for determining the center of an object on a moving system and properly position the center line of the object with respect to a mechanism for removing the object from the moving system.

Other objects and advantages of this invention will become obvious upon a further reading of the following detailed description of this invention.

Briefly stated, the geometric center line of an object or package on a moving conveyor may be determined and positioned with respect to a reference line defined by an object removal mechanism by initiating the operation of a timing means when the leading edge of the object passes a second reference line parallel to, and upstream from, the first reference line. The second reference line may be defined by photoelectric means or any other convenient means which will permit the timing means to operate in one manner while the package or object is passing the second reference line and in a different manner after the trailing edge of the object has passed the second reference line. The timing means operates towards a predetermined condition at a predetermined rate during the portion of the time that the object is passing the second reference line, and operates at double the predetermined rate after the object has passed the second reference line. The timing means will cause an indicator to designate the instant in time when the center line of the object is aligned with the first reference line when the timing means reaches its predetermined condition, if the predetermined rate is properly calculated with respect to the distance between the two reference lines and the velocity of the conveyor.

If the timing means comprises a capacitor, the capacitor may be adapted to charge at one rate while the package is interrupting the photoelectric means defining the second reference line and to charge at approximately double the rate after the package has passed the second reference line. The capacitor will then reach a voltage value sufficient to trigger a properly adjusted thyratron circuit at precisely the time when the center line of the package crosses the first reference line if the rate is properly chosen with respect to the distance between the reference lines and the velocity of the conveyor. Essentially, the system operates by dividing by two the time in which it takes the object to pass a reference line and adds that quotient to a constant equal to the time for a point on the conveyor to travel from the reference line to the center of the object removing mechanism.

For a detailed description of this invention reference is made to the accompanying drawings in which:

FIG. 1 is an isometric and partially schematic representation of a package sortation system having a loading station and transfer station, or sort, of the type in which the teachings of this invention may be employed;

Figure 3:
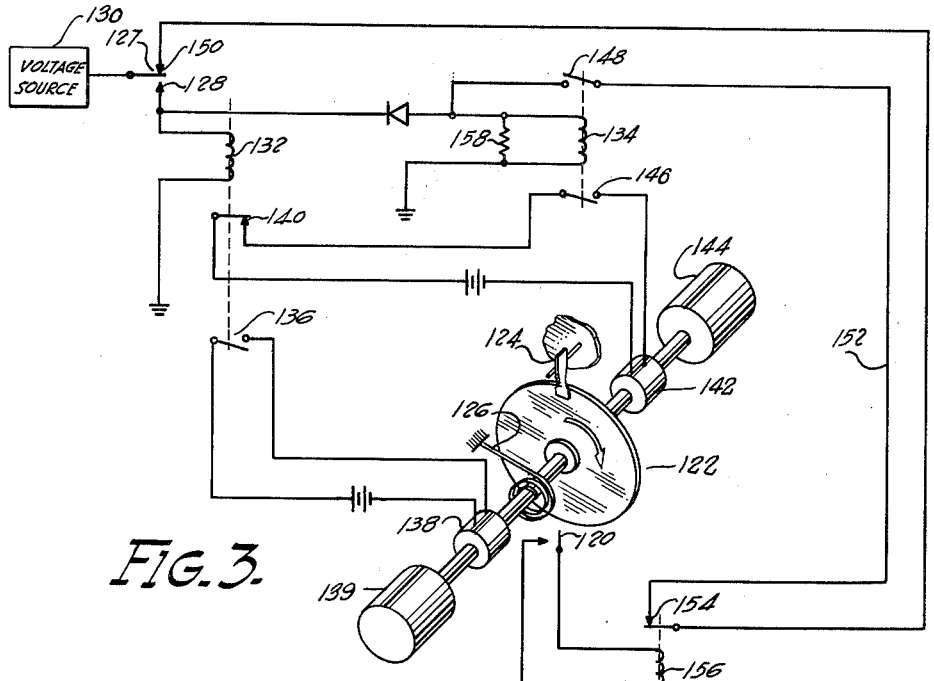
FIG. 3 is a schematic diagram of an electromechanical device for determining and positioning the center of a package.

The sortation system shown in FIG. 1 is one type to which the invention is readily adaptable and comprises a main sort conveyor belt 10 with a load station 12 at one end and one or more transfer stations or sorts 14 downstream therefrom. The load station 12 comprises a storage belt 16 upon which packages to be sorted are automatically or manually placed. An operator is stationed at a keyboard 18 to code the necessary analogue memory equipment (not shown) in accordance with the final destination of the package on the storage belt 16. The storage belt 16 transfers the packages on to a load belt 20 which operates to position the packages in front of a load mechanism 22. The load mechanism 22 comprises a paddle 23 which, when energized, transfers the packages on to the main sort conveyor 10 when an empty zone appears on the main sort conveyor 10 in accordance with well known principles.

For optimum transfer of a package by the load mechanism 22 from the load belt 20, and for accurate positioning of the package on the main sort conveyor 10, it is necessary that a package be properly centered in front of the paddle 23 when it operates to transfer the package. To accomplish this there is provided photocell means 24 and light source 26 which define a reference line 28 transverse to the path of travel of the load belt 20. A package on the load belt 20 which interrupts the beam forming the reference line 28 which causes the photocell means 24 to energize a control device 32. The control device 32, to be described in detail hereinafter, serves to turn off the load held drive motor 34 precisely at the proper time to center the package across a reference line 36 defined by the center of the paddle 23 and its line of operation transverse to the path of travel of the load belt 20.

A similar centering control device may be used at each of the sorts or transfer stations 14 along the main sort conveyor 10 and components thereat are referenced with the same numbers of the corresponding ports at the load station. It is not desirable to stop the main sort conveyor belt 10 at each sort 14 when a package is to be deposited thereat, so a centering control device is used to trigger the operation of transfer mechanism 22 at the sort. The transfer mechanism 22 also comprises a paddle 23 whose center and line of operation define a reference line 36 transverse to the direction of travel of the main sort conveyor 10. A photocell means 24 and light source 26 define another reference line 28 transverse to the path of operation of the main sort conveyor and upstream from the reference line 36. The control apparatus 32 at the transfer station 14 is energizable by the photocell means 24 and is operable to trigger the transfer mechanism 22a to push the package down a chute 50 when a package is centered across the reference line 36a.

Figure 2:
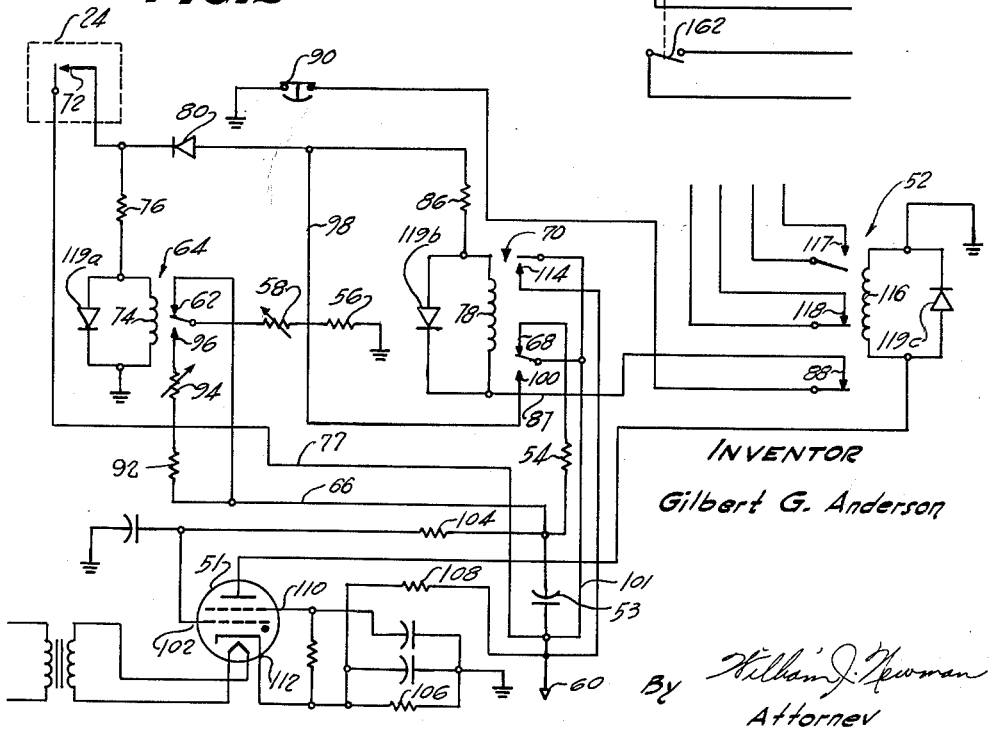
FIG. 2 is a schematic diagram of an electronic circuit for determining and positioning the center of a package.

A preferred embodiment of a centering control apparatus which may be used at either the load station 12 or transfer station 14 is shown in FIG. 2.

The centering control 32 comprises an electron tube 51, preferably a thyratron, which is normally cut off if a package is not on the conveyor between the reference lines 28 and 36 defined by the photocell beam and the position of the load or transfer mechanism paddle 23. The input circuitry to the thyratron 51 functions to fire the thyratron at the proper time so that the package will be aligned with the center of the load or transfer mechanism paddle. The current through the thyratron 51 energizes an actuator relay 52 to either stop the load belt 20 at the loading station 12 or to trigger the transfer mechanism 22 at the sort 14. The thyratron 51 is maintained in its cut off state until a timing capacitor 53 is charged to the firing voltage through suitable circuitry as hereinafter described.

When no package is present between the reference lines the timing capacitor 53 is charged to a very small value by virtue of its parallel connection across a low value resistor 54 which is series connected with timing resistors 56 and 58 between ground and a negative voltage source 60. The series circuit from ground to voltage source 60 comprise resistors 56 and 58, normally closed contacts 62 associated with a first relay 64, lead 66, resistor 54, and normally closed contacts 68 associated with a second relay 70.

The operation of the control circuit 32 to charge up capacitor 53 to a sufficient value to fire the thyratron 51 is initiated by the closure of contacts 72 in the photocell means 24 responsive to a package breaking the beam on the photocell. When the contacts 72 close, winding 74 of relay 64 is energized by the negative voltage supply 60 through current limiting resistor 76, contacts 72 and lead wire 77. When relay 64 energizes it releases contacts 62 and closes contact 96 to prepare a charging circuit for timing capacitor 53. Winding 78 of relay 70 is also energized by the negative voltage supply 60 through a circuit comprising lead 77, photocell contacts 72, diode 80, current limiting resistor 86, winding 78, lead 87, normally closed contacts 88 associated with the actuator relay 52 and a limit switch 90 to ground. The limit switch 90 is operable by the return of the loading or transfer mechanism paddle 23 to its home position for a reason to be hereinafter described.

The charging of capacitor 53 towards its thyratron firing value is, therefore, initiated by the leading edge of a package crossing the beam impinging on the photocell, whereby the closing of contacts 72 energizes relay 70 to open contacts 68 and open the low value resistor 54 shunt around the timing capacitor 53. The closing of contact 100 completes a holding circuit as hereinafter described. The capacitor 53 starts to charge through a circuit from the negative voltage source 60 through lead 66, additional timing resistors 92 and 94, normally open contacts 96 of first relay 64 and first timing resistors 58 and 56 to ground. The rate of charging of the capacitor 53 is hence determined by the value of the capacity of the timing capacitor 53 and the sum of the timing resistors 56, 58, 92 and 94.

When the trailing edge of the package passes the beam of impinging on the photocell, contacts 72 restore to their open position removing the negative voltage source 60 from the one end of relay 64 causing it to deenergize to break the contacts 96 and remake the contacts 62. The second relay 70 remains energized, however, even though its connection to the negative power supply through contacts 72 is broken, because of the completion of a holding circuit to the voltage supply 60 through resistor 86, lead 98, normally open contacts 100 and lead 101. Since the relay 64 is no longer energized breaking contacts 96 and remaking contacts 62, the capacitor will continue to charge but at a faster rate due to the elimination of the additional timing resistors 92 and 94 from their series connection with the timing resistors 56 and 58. If the combined resistance of resistors 56 and 58 is selected to be approximately equal to the combined resistance of resistors 92 and 94, it is apparent that the charging rate of capacitor after the package has passed the photocell beam and relay 64 has deenergized will be approximately twice the rate when relays 64 and 70 are both energized.

The charge on timing capacitor 53 is applied to control grid 102 of the thyratron 51 through a grid current limit resistor 104. The thyratron 51 will fire when the charge on timing capacitor 53 reaches a particular value dependent upon the selected resistance of resistors 106, 108, forming a voltage divider to provide the proper biasing voltages to the screen grid 110 and cathode 112. These resistors are connected in series to the voltage supply 60 through normally open contacts 114 associated with relay 70. Contacts 114 and resistor 108 also form a part of the cathode circuit for the thyratron 31.

As hereinbefore mentioned the current through the thyratron 51 energizes winding 116 of relay 52 to operate its associated contacts. Normally open contacts 117 as well as normally closed contacts 118 are shown in FIG. 2, but it is to be understood that only one set would be necessary in a specific application of this circuit. If the centering control 32 is being used at a load station 12 it is preferable that the relay 52 operate normally closed contacts such as 118 to open the circuit for energizing the load belt drive motor 32 and center the package in front of the load mechanism. If the centering control is being used at a transfer station or sort 14 it is preferable to use normally open contacts 117 to cause the transfer mechanism 22 to be energized to push the package off of the moving main sort conveyor 10. In the case of the load station where the relay 52 operates the normally closed contacts to open an energizing circuit for the load belt motor 22 there is usually provided another limit switch (not shown) operable by the return of the load mechanism back to its home position to reenergize the load motor 22. Thus, the belt remains nonoperative until the load mechanism 22 transfers the package from the load belt 20 to the main sort conveyor 10.

It will be noted that if the load mechanism 22 is awaiting an empty zone on the main sort conveyor at 10 to transfer a package that is positioned in front of its paddle 23 and another package is transferred from the storage belt 16 on to the load belt 20 in such a way that the leading edge of the package interrupts the beam on the photocell means 24, the timing capacitor 53 in the centering control 32 will periodically charge up to fire the thyratron 51 and then discharge. The will have no effect, however, on the nonoperational status of the load belt 20. In order to insure that the timing capacitor 53 will charge from its initial condition after the transfer mechanism 22 transfers the package on to the sort conveyor 10, the limit switch 90, hereinbefore mentioned, opens the ground circuit to the relay 70 to reconnect the low value resistance 58 around the timing capacitor 53 and discharge the capacitor 53 to its initial value.

It will be noted that the limit switch 90 performs essentially the same function as the contacts 88 to deenergize the relay 70 after the thyratron has fired and the load belt stopped so that the contacts 88 might well be eliminated. They do provide one safety measure, however. In the event that the main sort conveyor 10 is shut down and a package resides on the load belt in front of the load mechanism 22 the opening of contacts 88 will prevent continuous condition of the thyratron 51 as long as the sort conveyor 10 remains out of operation.

The diode 80 in the energizing circuit of relay 70 is provided to prevent relay 64 from being energized through the holding circuit previously described for relay 70. Diodes 119a, 119b and 119c suppress the surges that can be developed when relays 64, 70 and 52 respectively are deenergized.

The following is a description of the operation of the package centering control. It is assumed that the centering control is at the loading station, the load belt 20 moves at a rate of 4 feet per second, and the photocell means 24 and light source 26 defining reference line 28 are two feet from the center of the loading mechanism paddle 23 defining the reference line 36. In the first example it is also assumed that a very short package which is just long enough to break the beam to close the contacts 72 passes the photocell means 24. For simplicity of explanation it will be considered that the second relay 70 energizes but that the first relay 64 does not because of the short time the photocell means contacts 72 are made. The timing capacitor 53 will then charge at a rate determined only by the capacitance value of 53 and the resistance values of timing resistors 56 and 58. If these values are so chosen that the capacitor 53 will reach the trigger value of the thyratron 51 in 0.5 second, it will be seen that the small package will move two feet along the load belt before the thyratron 51 fires to cause relay 52 to open the contacts 118 in the circuit for the load belt motor 34.

Next, assume that a package 4 feet in length is on the load belt 20 so that both relays 64 and 70 will energize and remain so when the loading edge of the package breaks the beam. In this case, the timing capacitor 53 will be charged at a rate determined by the value of the capacitance and the total resistance of the series connected timing resistors 56, 58, 92 and 94. It will be recalled that the total resistance of resistors 92 and 94 approximately equals the total resistance of resistors 56 and 58 so that the charging time when they are in series will be one-half the rate when resistors 56 and 58, only, are in the charging circuit. The timing capacitor 53 will, therefore, charge in one second so that the package will travel four feet along the load belt 20 after the leading edge crosses the photocell beam. Since the photocell is located two feet from the center of the load mechanism the center of the package will come to rest opposite the center of the load mechanism.

A two foot package on the load belt 20 will cause the timing capacitor 53 to charge at the slow rate through the series connected resistors 92, 94, 58 and 56 for 0.5 second until the trailing edge of the package passes the photocell beam. At that time the capacitor 53 will have charged to one-half the triggering value. As the relay 64 deenergizes when the package passes the beam, the capacitor will then charge at approximately double the initial rate through resistors 56 and 58 only. Hence, the capacitor will charge the remaining portion to its triggering value in one-half the time it took to charge the first half of the triggering value or in 0.25 second. Since it takes 0.75 second total time to charge the timing capacitor 53 to its triggering value to stop the load belt motor 34 the belt will have traveled three feet from the time that the leading edge of the package broke the photocell beam, thus placing the center of the two foot package opposite the center of the load mechanism.

From the above examples it will be seen that the values of the timing capacitor and timing resistors are selected so that the capacitor will charge to its triggering value when all four resistors 92, 94, 56 and 58 are in the circuit in a time interval equal to $$\frac{2d}{v}$$

where $d$ is the distance between the photocell beam and the center of the load mechanism paddle, and $v$ is the velocity of the belt. The charging rate when only resistors 56 and 58 are in the circuit will be such as to cause the timing capacitor 53 to reach the triggering value in a time interval equal to $$\frac{d}{v}$$

It is readily apparent that the above examples and the formulas are also applicable to the centering circuit when it is used at the transfer station. The firing of the thyratron when the timing capacitor reaches its triggering value will, in that case, cause the transfer mechanism to push the package off of the moving main sort conveyor at precisely the time when the center of the package is aligned with the center of the transfer mechanism.

Reference is now made to FIG. 3 for a description of another embodiment of the package centering control apparatus utilizing electromechanical techniques. In this embodiment the thyratron of FIG. 2 is replaced by a switch 120 and the timing capacitor 53 is replaced by a rotatable member 122 having an arm 124 which is adapted to operate the switch 120 when the member 122 revolves to that position. The member 122 is biased towards its starting position by a spring 126 so that the arm 124 will be maintained in its starting position when the device is not operating.

The operation of switch 127 to close normally opened switch contacts 128, which are operable responsive to initiating means such as the breaking of a photocell beam as in the first embodiment, serves to apply negative voltage from source 130 to the first and second relays 132 and 134 respectively. The energization of first relay 132 closes normally open contacts 136 to connect battery potential to an electrically operated clutch mechanism 138, of any well known type, to cause the rotating member 122 to be driven by a motor 139. The first relay 132 also opens normally closed contacts 140 to prevent the other electrically operated clutch 142 from engaging the other motor 144 with the rotatable member 122. The energization of second relay 134 prepares the circuit for energizing the clutch 142 by making the normally open contacts 146. The relay 134 also prepares a hold circuit for itself by closing normally open contacts 148.

During the portion of time that the normally open contacts 128 are made, corresponding, for example, to the period of time a package is blocking the photocell beam, the rotating member is rotating at a speed determined by the speed of the motor 139. When switch 127 falls back, such as when the trailing edge of the package passes the photocell beam, normally closed contacts 150 are made to complete the prepared hold circuit for second relay 134 comprising contacts 148, lead 152, contacts 154 associated with actuating relay 156 and the closed contacts 150 to the negative power source 130. Resistor 158 is in parallel with the winding of relay 134 to hold it energized while switch 127 is falling back to close its contacts 150.

Since relay 132 is now deenergized contacts 136 are again opened releasing clutch 138, and contacts 140 are again made to complete the energizing circuit for the other clutch 142. The speed of motor 144 now determines the rate of rotation of element 122 until such time that the arm 124 closes the contacts on switch 120. When switch 120 is actuated it closes an obvious energizing circuit to the actuator relay 156 to break normally closed contacts 160. Contacts 160 might be connected in a circuit for a device such as the drive motor to the load belt so that it will then be deenergized. Alternatively, the actuator relay 156 may have normally open contacts 162 which may be connected in a circuit for a transfer mechanism at a transfer station or sort of a sortation system. Normally closed contacts 154 are actuated by the relay 156 to open the hold circuit for relay 134 thus restoring the device to its initial condition after the actuation of switch 120.

If this embodiment is used in a sortation system of the type described for the electronic package centering control shown in FIG. 2, the speed of motor 139 should be selected so that it operates the rotating element 122 to cause the arm 124 to actuate switch 120 in a time interval equal to $$\frac{2d}{v}$$

where $d$, again, is the distance between the photocell and the center of the load or transfer mechanism paddle, and $v$ is the velocity of the belt. The speed of motor 144 should then be selected to rotate the arm 124 into actuation with switch 120 in the time interval equal to $$\frac{d}{v}$$

While two embodiments of the invention have been described in detail above it will be obvious to one skilled in the art that other modifications and arrangements may readily be made without departing from the scope of the invention. It is therefore intended that this invention be limited, not by the detailed description, but only by the appended claims.

What is claimed is:

1. A device for centering an object with respect to a reference line comprising means for moving said object at a predetermined velocity in a direction towards and transverse to said reference line, a photocell and light beam defining a second reference line parallel to and upstream from said first reference line, resistance capacitance means chargeable towards a predetermined value when the leading edge of said object crosses said second reference line, said resistance capacitance means chargeable at a predetermined rate until said object passes said second reference line and chargeable at double said predetermined rate after said object has passed said second reference line, means for indicating the alignment of the center of said object with said first reference line operable responsive to the charging of said resistance capacitance means to said predetermined value, said predetermined rate being determined by the distance between said reference lines and the velocity of said moving means.

2. A device for centering an object with respect to a reference line, comprising a conveyor for moving said object at a predetermined velocity in a direction transverse to and toward said reference line, photoelectric means defining a second reference line parallel to and upstream from said first reference line, a capacitor, first and second relay means operable responsive to the passage of the leading edge of said object across the second reference line for charging said capacitor at a predetermined rate toward a predetermined voltage, said first relay means also responsive to the passage of the trailing edge of said object across the second reference line for causing said capacitor to continue to charge toward said predetermined voltage at double said predetermined rate, and means for indicating the alignment of the center of said object with said first reference line when said capacitor is charged to said predetermined voltage, said capacitor having a value such that said predetermined voltage will be attained in a time interval equal to $$\frac{2d}{v}$$

when being charged at the predetermined rate where $d$ is the distance between the two reference lines and $v$ is the velocity of the conveyor.

3. A device for centering an object with respect to a reference line, comprising a conveyor for moving said object at a predetermined velocity in a direction transverse to and toward said reference line, photoelectric means defining a second reference line parallel to and upstream from said first reference line, a capacitor, a charging circuit comprising a resistance and a voltage source, a first and a second relay operable responsive to the passage of the leading edge of said object across the second reference line to connect said capacitor into said charging circuit to charge said capacitor at a predetermined rate toward a predetermined voltage, said first relay also being responsive to the passage of the trailing edge of said object across the second reference line to remove a portion of said resistance from said charging circuit to cause said capacitor to continue to charge toward said predetermined level at double said predetermined rate, and means including an electron tube for indicating the alignment of the center of said object with said first reference line, said tube initially biased to prevent conduction until said capacitor is charged to said predetermined voltage, said capacitor having a value such that said predetermined voltage will be attained in a time interval equal to $$\frac{2d}{v}$$

when being charged at the predetermined rate where $d$ is the distance between the two reference lines and $v$ is the velocity of the conveyor.

References Cited in the file of this patent

UNITED STATES PATENTS

| | | |
|---|---|---|
| 2,941,126 | Frankenfield | June 14, 1960 |
| 2,987,162 | Griffin | June 6, 1961 |